United States Patent [19]

Schachnow et al.

[11] 3,775,643

[45] Nov. 27, 1973

[54] SUPPORT ASSEMBLY FOR PLUGGED-IN PC CARD COMPRISING SELF-MOUNTABLE CHANNELS WITH PLASTIC LINERS

[75] Inventors: Stanley Schachnow, Torrance; Frederick J. Siegler, Santa Monica, both of Calif.

[73] Assignee: Elco Corporation, Willow Grove, Pa.

[22] Filed: Feb. 8, 1972

[21] Appl. No.: 224,464

[52] U.S. Cl. .......................... 317/101 DH, 317/119
[51] Int. Cl. .......................... H05k 7/18
[58] Field of Search .......................... 317/100, 101 DH, 317/117, 119

[56] References Cited

UNITED STATES PATENTS

| | | | |
|---|---|---|---|
| 3,549,950 | 12/1970 | Shelden | 317/101 DH |
| 3,309,580 | 3/1967 | Jacobs | 317/119 |
| 3,243,663 | 3/1966 | Rowe | 317/119 |
| 3,098,177 | 7/1963 | Bleier | 317/101 DH |
| 3,377,515 | 4/1968 | Erb | 317/101 DH |

FOREIGN PATENTS OR APPLICATIONS

| | | | |
|---|---|---|---|
| 2,030,906 | 12/1970 | Germany | 317/101 DH |

*Primary Examiner*—Robert K. Schaefer
*Assistant Examiner*—Gerald P. Tolin
*Attorney*—D. R. Pressman

[57] ABSTRACT

A support assembly for a printed circuit (PC) module card comprises a pair of elongated metal channels and respective thermoplastic liners. One end of each channel is mounted around the respective end of a plate-mounted cardedge receptacle by means of guide and locking fingers which extend through apertures in the plate and lock the channel thereto. The rest of the channel extends upwardly to provide an insertion guide and mounting support for "tall" module cards. The lower end of each liner is inserted between the bottom portion of the channel and the end of the receptacle to rigidify the channel. Near the top of each liner is a boss which fits into a mating hole in the channel and at the upper end of each liner is a shoulder which mates with a respective shoulder on the channel, thereby releasably to lock the liner to the channel. The liner insulates the card from the channel and insures a tight fit between the card and the channel.

7 Claims, 1 Drawing Figure

PATENTED NOV 27 1973 3,775,643
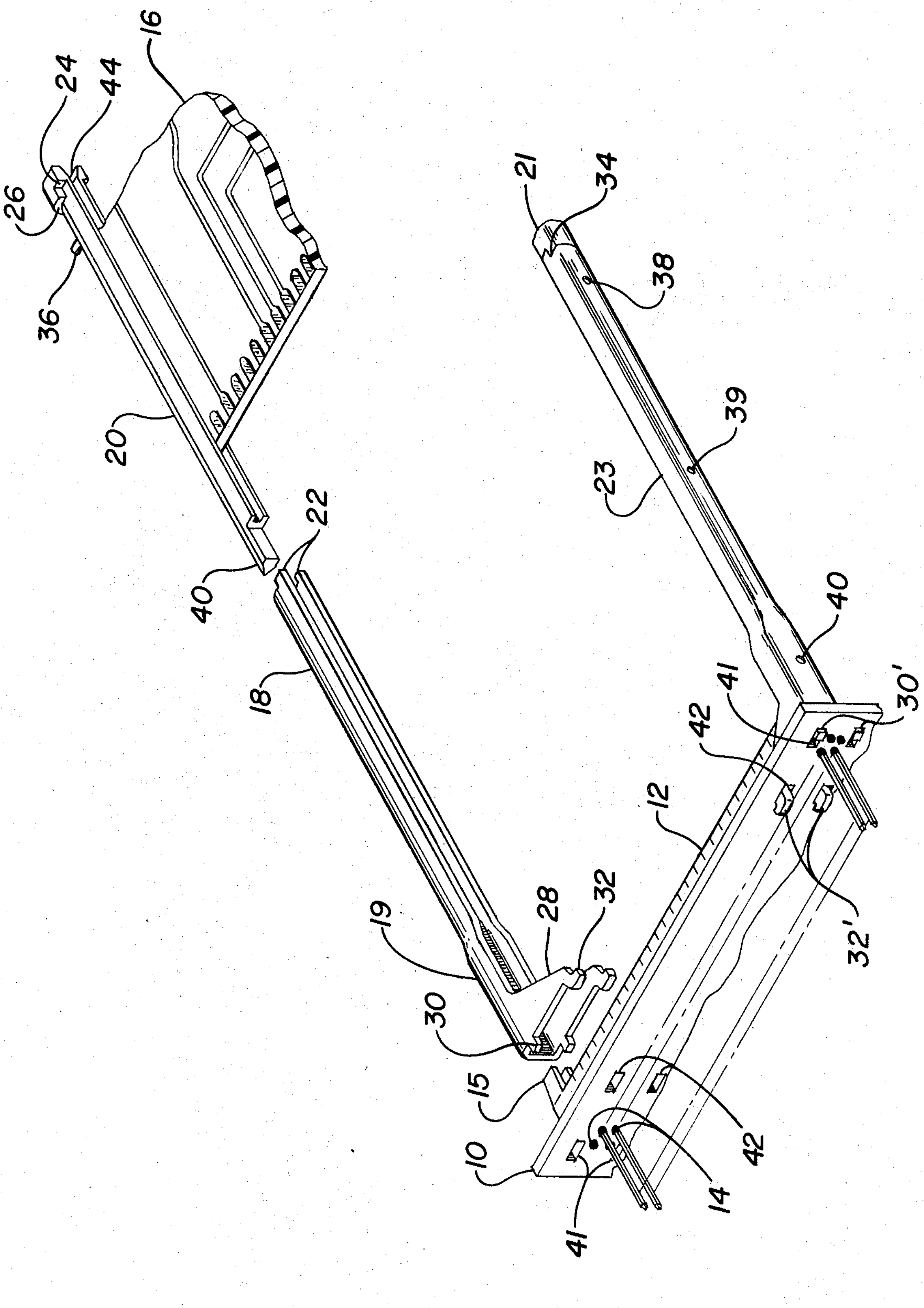

SUPPORT ASSEMBLY FOR PLUGGED-IN PC CARD COMPRISING SELF-MOUNTABLE CHANNELS WITH PLASTIC LINERS

BACKGROUND — FIELD OF INVENTION

This invention relates generally to the electrical connector art and particularly to a support assembly for use with a "tall" printed circuit (PC) module card which is plugged into a cardedge connector.

BACKGROUND — PRIOR ART

As is well known, the trend in the electronic industry is toward modularization, i.e., the fabrication of complex items of electronic equipment (e.g., televisions, computers) in the form of a plurality of subassemblies, each of which may readily be removed and replaced from the equipment as a whole. The principal advantage of modularization is ease of servicing, as will readily be apparent to those skilled in the art.

In order to employ readily replaceable subassemblies or modules, it is necessary that these be pluggable into the master unit. In electronic equipment, each module comprises a printed circuit (PC) board or card having a plurality of electronic components (e.g., transistors, diodes, resistors, capacitors, etc.) mounted thereon. The components on the PC card serve to provide a recognizable subfunction for the master unit. For example, a card may contain the audio circuitry for a television receiver or an adder for a computer.

A common type of pluggable PC card has printed circuit conductors thereon which terminate as equally-spaced, broad conductors (known as "pads") at the edge of the card. The card can be plugged into a cardedge receptacle which contains springy contacts for making connections with the respective pads at the edge of the card. A series of such cardedge receptacles usually are mounted on a master chassis board (motherboard) which may contain wiring therebeneath to interconnect the module cards (via the contacts of the cardedge receptacles) according to the wiring pattern of the electronic system.

If the card is relatively small and has few components thereon, and if the equipment is not subject to acceleration forces while in use, the force provided by the contacts of the cardedge receptacle and the restraint provided by short upright guides at the ends of the receptacle usually will be sufficient to hold the module card in position during use.

However if the card is large, has many components thereon, or the equipment is subject to acceleration forces, the receptacle will not be sufficient to hold the card in position. Thus some additional means of mechanical restraint is required.

One way of providing additional mechanical restraint is through the use of a "card cage" or card frame assembly designed to hold a plurality of cards and a plurality of parallel-mounted card edge receptacles. While the card cage serves this purpose well, it does not provide sufficient flexibility to accomodate a motherboard which must be wired in an automatic wire wrapping machine or which contains several rows of cardedge receptacles (each row containing a plurality of parallel-mounted receptacles).

In practice it is not possible to increase the height of the integral upright guides at the respective ends of the receptacle sufficiently to provide adequate mechanical restraint to the cards. This is so because the receptacle is plastic, which does not have sufficient strength to provide a very long, yet adequately rigid member. Although it would be possible to provide a rigid enough guide of plastic by using material of relatively great thickness, this would be highly undesirable in view of (1) the necessity to mount cards as close as possible in order to provide electronic equipment of maximum compactness, and (2) the necessity to introduce as much cooling air as possible around each card to prolong the life of the electronic components mounted thereon.

Accordingly several objects of the present invention are: (1) to provide a new and improved mechanical restraint for PC cards which are plugged into cardedge receptacles, (2) to provide such a mounting means which allows boards to be spaced very closely together, yet allows cooling air to pass around each board, and (3) to provide such a mounting assembly which is strong and rigid, yet simple in construction, low in cost, reliable in operation, and easy to install. Further objects and advantages of the invention will become apparent from a consideration of the ensuing description thereof.

DRAWING

The single FIGURE of drawing shows the support assembly of the invention in conjunction with a plate-mounted cardedge receptacle and a PC card (fragmentary showing) designed to be plugged into such receptacle. One half of the support assembly is shown in exploded form and the other half is shown assembled.

DESCRIPTION OF INVENTION

A mounting plate or motherboard 10 has a cardedge receptacle 12 mounted thereon by any conventional means (e.g., force fit of the receptacle's contact mounting hubs, such as 14, in respective apertures of the plate.) Receptacle 12 has integral upright end guides or supports as shown at 15 which aid in guiding and retaining a PC card such as 16 when same is plugged into receptacle 12.

If card 16 is relatively tall, has many components (not shown) mounted thereon, or the whole assembly including plate 10 is to be subject to acceleration forces, receptacle 12 and end guides 15 will not provide sufficient mechanical restraint for normal reliability. Moreover end guides 14 cannot be made tall enough to accomplish the desired result since it is not possible to provide a tall enough plastic member with adequate strength to accomplish this result, unless very thick material is employed.

According to the invention, a support assembly for card 16 is provided by means of a pair of metal channels 18 and 23 and a pair of respective thermoplastic liners 20 and 21. Each channel preferably is made of aluminum about 50 mils thick and about six inches long. One end of each channel (e.g., channel 18) contains a pair of projecting fingers 22. Each liner (e.g., liner 20) contains a widened end portion 26 which has a pair of recesses as shown at 24 which mate with fingers 22. The other end of each channel (e.g., 18) contains a widened portion 19 and orthogonal support arms, such as 28, which are integral with and project from the respective sides of portion 19. Each arm contains two sets of fingers: a pair of straight fingers, such as 30, and a pair of hook fingers, such as 32. As explained infra, arms 28 on each channel member constitute means for self-mounting the channel in an upright position on a supporting surface. Each channel contains a plurality of spaced holes 38, 39, 40 which facilitate disassembly, as explained infra.

Liners 20 and 21 are also generally channel-shaped and preferably made of a flexible material such as nylon. One end of each liner, as stated, contains a widened end portion 26 which forms a shoulder having recesses such as 24 which interfit with the end fingers at the end of the metal channels as indicated in the assembled side at 34. Liner 20 also contains an integral boss or finger projection 36 designed to fit into hole 38 in the upper portion of each channel. Elements 24–26 and 36–38 thus constitute cooperating interlocking means for securing the respective channel and liners together. The other end of liner 20 comprises a projecting finger 40 designed to fit between the base of each channel 18 and a respective end of receptacle 12.

When used with the support assembly of the invention, plate 10 may be conventional in all respects except that four holes as indicated at 41 and 42 are provided adjacent the end of each receptacle in order to accomodate the straight and hook fingers 30 and 32, respectively. These holes are preferably of a rectangular shape and positioned such that when the end holes 40 receive fingers 30' at the outer sides of the holes as indicated on the assembled side of the plate, hook fingers 32 will fit through holes 42 and hook under the plate as also on the assembled side of the plate at 32'.

USE OF INVENTION

After receptacle 12 is mounted on plate 10 in conventional fashion, the support assembly of the invention is mounted as follows:

Metal channel 18 is first positioned so that the widened base portion 19 thereof is fitted around the end of receptacle 12 and the orthogonal arms 28 are adjacent plate 10. The channel is the tilted inwardly and hooked fingers 32 are inserted in respective holes 42 and the fingers hooked under the plate. The channel is then returned to an upright position until straight fingers 30 are inserted into respective holes 40 and arms 28 are adjacent the surface of plate 10. Liner 20 is now installed by inserting finger 40 thereof between the end of receptacle 12 and the widened portion 19 of channel 18. Liner 20 is then pushed against channel 18 and downwardly until boss 36 snaps into hole 38 and recesses 24 of liner 20 snap around fingers 22 of channel 18. Thereupon installation of the support assembly is completed and the assembly will hold itself rigidly in position. That is, the support assembly cannot be tilted outwards or sidewards because the end fingers 32 are hooked under plate 10. The assembly cannot be tilted inwardly because liner 20 fits between the channel 18 and receptacle 12 tightly.

After channel 23 and liner 21 on the other side are assembled in similar fashion, card 16 can be inserted into the groove in the liners and pushed downwardly until it plugs into receptacle 12. The end of each liner contains widened lead-in portion as indicated at 44 to facilitate such insertion. The dimension of the groove in each liner is such that friction is provided between each liner and card 16 so as to retain card 16 firmly.

To disassemble the components, card 16 is merely withdrawn upwardly to unplug it from receptacle 12 and remove it from the support assembly. Liner 20 is next removed preferably with the aid of a removal tool consisting of a thin pin or rod. The pin preferably is inserted in hole 39 and pushed inwardly in order to push the liner (e.g., 21) away from channel 23 until boss 36 is freed from hole 38, whereupon liner 20 can be pulled upwardly and out, e.g., manually or with the aid of pliers. Alternatively, the assembly can be disassembled entirely manually by freeing boss 36 from hole 38 by grasping portion 26 of liner 20 and tilting same outwardly. Lastly the channels are removed by merely tilting them inwardly and lifting hook fingers 32 out of holes 42.

The support assembly has been found to be very rigid and supply adquate support for PC cards of various heights and having many components mounted thereon. Yet the assembly still permits cardedge receptacles such as 12 to be mounted very closely together without significantly impeding the flow of cooling air between adjacent cards.

It will be appreciated that the support assembly can be made in various heights, depending upon the size of the card 16 which is to be retained. The length of the orthogonal arms 28 should be increased in proportion to the length of the channels in order to provide sufficient rigidity.

While the above description contains many specificities, these should not be construed as limitations upon the scope of the invention but merely as a exemplification of one preferred embodiment thereof. The true scope of the invention is indicated by the subject matter of the appended claims and their legal equivalents.

We claim:

1. A support assembly for a printed circuit card, comprising:

a pair of elongated, rigid channel members, each having a generally U-shaped cross-sectional configuration defined by an elongated center portion, and two generally parallel, elongated side portions which extend integrally from opposite sides of said center portion, said side portions being uniformly spaced apart from at least most of their length to define a slot of predetermined width, one end of each of said channel members including means for self-mounting its channel member in an upright position on a supporting surface with said slots opening toward each other to provide opposing supports, a pair of elongated flexible liners, each comprising an elongated member having a generally U-shaped cross-sectional configuration defined by an elongated center portion, and two generally parallel, elongated side portions which extend from opposite sides of said center portion, said side portions being spaced apart to define a slot of a predetermined width substantially smaller than the length thereof so as to be able to hold the edge of a printed circuit card, the width of each of said liners, as measured between the outside surfaces of said side portions, being substantially equal to the width of said slot of each of said channel members so that said channel members can embrace said respective liners, said channel members and said liners both including cooperating interlocking means detachably securing said channel members and said respective liners together, said cooperating means on each of said liners including a finger extension, generally oriented in the direction of the axis of its liner, at one end of said liner, a boss on the surface of said liner on the side thereof opposite said slot which fits in an aperture in its respective channel member, and an enlarged portion at the other end of said liner forming a shoulder facing said one end of said liner, and abutting the upper end of its respective channel member.

2. The assembly of claim 1 wherein said shoulder of said enlarged portion of said liner includes a pair of recesses at the edge of said liner adjacent said slot thereof, and the upper end of each of said channel members includes a pair of finger extensions shaped to mate with said pair of recesses of said liner.

3. A support assembly for a printed circuit card comprising:

a pair of elongated, rigid channel members, each having a generally U-shaped cross-sectional configuration defined by an elongated center portion and two generally parallel, elongated side portions which extend integrally from opposite sides of said center portion, said side portions being uniformly spaced apart for at least most of their length to define an elongated slot of predetermined width, one end of each of said channel members including means extending from said side portions for self-mounting its channel member in an upright position on a supporting surface, so that the longitudinal axis of each of said channel members said elongated extends substantially perpendicular to said supporting surface, and said slots open toward each other to provide opposing supports, a pair of elongated flexible liners, each comprising an elongated member having a generally U-shaped cross-sectional configuration defined by an elongated center portion, and two generally parallel, elongated side portions which extend from opposite sides of said center portion, said side portions being spaced apart to define a slot of a predetermined width substantially smaller than the length thereof so as to be able to hold the edge of a printed circuit card, the width of each of said liners, as measured between the outside surfaces of said side portions, being substantially equal to the width of said slot of each of said channel members so that said channel members can embrace said respective liners along a substantial portion of the length of said liners, said channel members and said liners both including cooperating interlocking means detachably securing said channel members and said respective liners together.

4. The assembly of claim 3 wherein said channel members are formed of metal and said liners are formed of plastic.

5. The assembly of claim 3 further including (1) a supporting surface, said surface comprising a plate member having upper and lower planar, parallel surfaces which are spaced closely in relation to the dimensions of said member in the plane of said surfaces, and (2) an elongated cardedge receptacle, said receptacle being mounted on said plate member, said channel members also being mounted in an upright position on said member with their bottom portions around and adjacent opposite ends of said receptacle, said liners being secured to said channel members, respectively.

6. A support assembly for a printed circuit card comprising:

a pair of elongated, rigid channel members, each having a generally U-shaped cross-sectional configuration defined by an elongated center portion and two generally parallel, elongated side portions which extend integrally from opposite sides of said center portion, said side portions being uniformly spaced apart for at least most of their length to define a slot of predetermined width, one end of each of said channel members including means for self-mounting its channel member in an upright position on a supporting surface with said slots opening towards each other to provide opposing supports, said means for mounting each of said channel members including a pair of extensions at the end of each channel member extending from the respective sides of said channel member, each extension having a bottom edge and a general orientation perpendicular to the axis of its channel member, such that when said bottom edges rest on said supporting surface, the axis of said channel member will be perpendicular to said surface, and a plurality of finger portions extending from said bottom edge of each extension for insertion in apertures in said surface for securing each cahnnel member to said surface, a pair of elongated flexible liners, each comprising an elongated member having a generally U-shaped cross-sectional configuration defined by an elongated center portion and two generally parallel, elongated side portions which extend from opposite sides of said center portion, said side portions being spaced apart to define a slot of a predetermined width substantially smaller than the length thereof so as to be able to hold the edge of a printed circuit card, the width of each of said liners, as measured between the outside surfaces of said side portions, being substantially equal to the width of said slot of each of said channel members so that said channel members can embrace said respective liners, said channel members and said liners both including cooperating interlocking means detachably securing said channel members, and said respective liners together.

7. The assembly of claim 6 further including (1) a supporting surface, said surface comprising a plate member having upper and lower planar, parallel surfaces which are spaced closely in relation to the dimensions of said member in the plane of said surfaces, and (2) an elongated cardedge receptacle, said receptacle being mounted on said plate member, said plate member having a plurality of apertures therethrough adjacent the respective ends of said receptacle, said channel members also being mounted in an upright position on said member with their bottom portions around and adjacent the respective ends of said receptacle and said finger projections extending into said apertures of said plate, respectively, some of said finger members extending under said plate and underlying a lower surface thereof.

* * * * *

UNITED STATES PATENT OFFICE

CERTIFICATE OF CORRECTION

PATENT NO. : 3,775,643

DATED : November 27, 1973

INVENTOR(S) : Stanley Schachnow et al.

It is certified that error appears in the above-identified patent and that said Letters Patent are hereby corrected as shown below:

Column 5, line 31 delete "said elon-";

line 32 delete "gated".

Column 6, line 28, change "cahnnel" to --channel--.

Signed and Sealed this

Sixth Day of July 1976

[SEAL]

*Attest:*

RUTH C. MASON
*Attesting Officer*

C. MARSHALL DANN
*Commissioner of Patents and Trademarks*